United States Patent
Jager et al.

(10) Patent No.: US 11,706,792 B2
(45) Date of Patent: Jul. 18, 2023

(54) SYSTEMS AND METHODS FOR PREEMPTING BEARERS BASED ON BEARER INFORMATION AND NETWORK SLICE INFORMATION

(71) Applicant: Verizon Patent and Licensing Inc., Basking Ridge, NJ (US)

(72) Inventors: Frank Jager, Chester, NJ (US); Jignesh S. Panchal, Hillsborough, NJ (US); Jin Yang, Orinda, CA (US); Kristen Sydney Young, Mine Hill, NJ (US); Yuexin Dong, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 115 days.

(21) Appl. No.: 17/448,993

(22) Filed: Sep. 27, 2021

(65) Prior Publication Data
US 2023/0100069 A1    Mar. 30, 2023

(51) Int. Cl.
*H04W 72/56*    (2023.01)
*H04W 76/10*    (2018.01)
*H04W 48/16*    (2009.01)
*H04W 48/18*    (2009.01)

(52) U.S. Cl.
CPC ......... *H04W 72/56* (2023.01); *H04W 48/16* (2013.01); *H04W 48/18* (2013.01); *H04W 76/10* (2018.02)

(58) Field of Classification Search
CPC ..... H04W 72/56; H04W 48/16; H04W 48/18; H04W 76/10
See application file for complete search history.

(56) References Cited

U.S. PATENT DOCUMENTS

2022/0046652 A1*    2/2022    Yang ................. H04L 47/24

OTHER PUBLICATIONS

3GPP TS 22.261, V16.6.0, 3rd Generation Partnership Project; Technical Specification Group Services and System Aspects; Service requirements for the 5G system; Stage 1 (Release 16), Dec. 2018, 73 pages.
3GPP TS 23.501, V15.4.0, 3rd Generation Partnership Project; Technical Specification Group Services and System Aspects; System Architecture for the 5G System; Stage 2 (Release 15), Dec. 2018, 236 pages.

(Continued)

*Primary Examiner* — Diane D Mizrahi

(57) ABSTRACT

A device may receive a request to establish a communication session with a network. The request includes first bearer information regarding a bearer and first network slice information regarding a network slice of the network. The device may generate a first priority value, associated with the request, based on the first bearer information and the first network slice information. The device may obtain second bearer information regarding active bearers associated with existing communication sessions and second network slice information regarding one or more network slices, of the network, associated with the active bearers. The device may generate second priority values associated with the active bearers based on the second bearer information and the second network slice information. The device may compare the first priority value and the second priority values. The device may preempt one or more of the active bearers based on the comparison.

20 Claims, 8 Drawing Sheets

(56) References Cited

OTHER PUBLICATIONS

3GPP TS 38.304, V15.2.0, 3rd Generation Partnership Project; Technical Specification Group Radio Access Network; NR; User Equipment (UE) procedures in Idle mode and RRC Inactive state (Release 15), Dec. 2018, 28 pages.

3GPP TS 38.331, V15.4.0, 3rd Generation Partnership Project; Technical Specification Group Radio Access Network; NR; Radio Resource Control (RRC) protocol specification (Release 15), Dec. 2018, 474 pages.

* cited by examiner

SYSTEMS AND METHODS FOR PREEMPTING BEARERS BASED ON BEARER INFORMATION AND NETWORK SLICE INFORMATION

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, and/or high-frequency communication (e.g., millimeter wave (mm-Wave)), among other examples.

DETAILED DESCRIPTION OF PREFERRED EMBODIMENTS

Figure 1A:
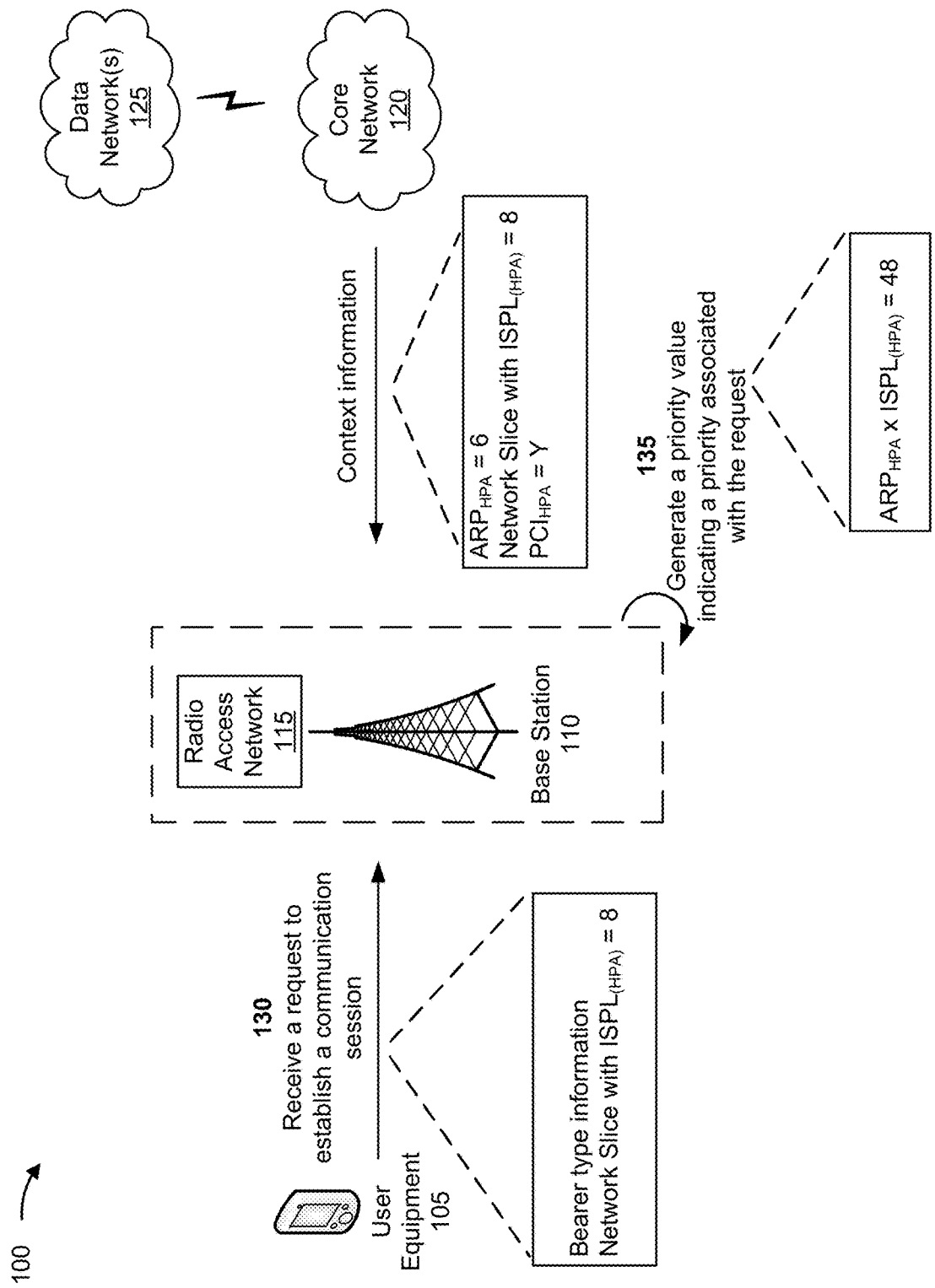
FIGS. 1A-1D are diagrams of an example associated with preempting a bearer associated with a communication session in accordance with an embodiment described herein.

The following detailed description of example implementations refers to the accompanying drawings. The same reference numbers in different drawings may identify the same or similar elements.

A bearer (e.g., a network resource) can be allocated to establish a new incoming communication session with a network. When there are insufficient bearers in the network to support the new incoming communication session, a bearer, associated with an existing communication session, may be preempted in order to establish the new communication session. For example, the existing communication session may be terminated, and the bearer may be used to establish the new communication session. Decisions to terminate an existing communication session in favor of a new session may be based on priorities associated with the two sessions. A priority associated with the existing communication session may be lower than a priority associated with the new communication session.

Typically, a priority associated with a communication session is based on a priority associated with a bearer that is used to establish the communication session. The priority associated with the bearer may be determined based on an allocation and retention priority (ARP) value associated with the bearer. Current preemption algorithms (for preempting a bearer) may be based exclusively on the ARP value associated with the bearer. Such preemption algorithms do not take into consideration 5G/New Radio (5G/NR) differentiation associated with using different network slices of a network. Network slicing can introduce ambiguities with respect to appropriately determining priorities associated with bearers.

The ambiguities may cause a relative priority associated with a bearer (associated with a network slice) to be inaccurately determined and, accordingly, cause the bearer to be improperly preempted. Therefore, an existing communication session associated with the bearer may be unintentionally preempted (or terminated). Unintentionally preempting the existing communication session wastes computing resources, network resources, and other resources associated with determining a cause of unintentionally preempting the existing communication session, re-determining a priority associated with the bearer, and/or re-establishing the existing communication session, among other examples. Additionally, unintentionally preempting the existing communication session complicates a process associated with establishing and maintaining absolute priority between bearers and causes customer dissatisfaction.

The present disclosure addresses the ambiguities described above by determining a priority associated with a bearer associated with a network slice in order to properly preempt a most appropriate bearer. For example, a device (e.g., a base station) may determine a priority value, indicating the priority associated with the bearer, based on bearer information regarding the bearer and network slice information regarding the network slice. The bearer information may include bearer type information regarding a type of bearer. In some examples, the bearer type information may be used to identify an ARP value. The network slice information may include information regarding the network slice. In some examples, the information regarding the network slice may include an inter-slice priority level (ISPL) value associated with the network slice. By determining the priority based on, for example, the bearer information and the network slice information as described herein, the device may remove the ambiguities described above with respect to determining priorities associated with bearers that are associated with one or more network slices.

Accordingly, the device may ensure that an existing communication session is properly preempted (in order to establish a new communication session). By ensuring that the existing communication session is properly preempted, the network device may preserve computing resources, network resources, and other resources that would have been consumed by determining a cause of improperly preempting the existing communication session, re-determining a priority associated with the bearer, and re-establishing the existing communication session.

FIGS. 1A-1D are diagrams of an example 100 associated with preempting a bearer associated with a communication session. As shown in FIG. 1A, example 100 includes a user equipment (UE) 105, a base station 110, a radio access network (RAN) 115, a core network 120, and one or more data networks 125 (referred to individually as "data network 125" and collectively as "data networks 125"). Example 100 illustrates various portions of a wireless telecommunications system (referred to herein as a "wireless network"). The wireless network may be a 5G wireless telecommunications system, among other examples of wireless telecommunications systems. UE 105, base station 110, RAN 115, core network 120, and data networks 125 are described in more detail below in connection with FIGS. 2 and 3.

In some examples, UE 105 may be wirelessly connected to RAN 115 at base station 110. Base station 110 may be connected to data network 125 via core network 120. In the example that follows, assume that UE 105 is executing an application that involves communicating with data network 125. Accordingly, assume that UE 105 desires to enter into a communication session (e.g., a protocol data unit (PDU) session) with data network 125 via RAN 115 and core network 120.

As shown in FIG. 1A, and by reference number 130, base station 110 may receive a request to establish the communication session. For example, UE 105 may provide the request to establish the communication session with data network 125, and base station 110 may receive the request from UE 105. In some examples, the request may be associated with a high priority access (HPA) incoming call. In this regard, the request may include HPA information indicating that the request is associated the HPA incoming call. As an example, the HPA incoming call may be a call initiated by a law enforcement agency, a call initiated by a 911 operator, or a call associated with a particular service level agreement, among other examples.

Assume that, for the purpose of properly executing the application, UE 105 requests to establish the communication session via a bearer (e.g., a network resource) associated with an allocation and retention priority (ARP) value and via a network slice (e.g., of core network 120) associated with a desired ISPL value. In this regard, the request may include first bearer information regarding the bearer (e.g., bearer type information regarding a type of bearer requested for the communication session) and first network slice information regarding the network slice. For example, the first bearer information may be associated with an operator policy assigned ARP value, and the first network slice information may include the desired ISPL value.

The desired ISPL value may be part of network slice selection assistance information (NSSAI) that identifies the network slice. The NSSAI may include a collection or list of individual, single-network slice selection assistance information (S-NSSAI) (referred to herein individually and collectively as "S-NSSAI") that identifies the network slice. In this regard, the first network slice information may include the S-NSSAI that identifies the network slice, and the desired ISPL value may be part of the S-NSSAI. For example, the desired ISPL value may include one or more bits of the S-NSSAI.

As shown in FIG. 1A, base station 110 may receive context information from core network 120. For example, base station 110 may provide information included in the request to core network 120 and core network 120 may provide the context information. The context information may include the assigned ARP value and an assigned ISPL value (which may correspond to the desired ISPL value). The assigned ARP value may identify an assigned priority associated with the bearer to be used to establish the communication session. The assigned ISPL value may identify an assigned priority associated with the network slice to be used to establish the communication session. In some implementations, the assigned ARP value and/or the assigned ISPL value may be associated with a desired quality of service associated with UE 105, a desired performance of UE 105, and/or the particular service level agreement. Assume that the request is associated with an HPA call, the assigned ARP value may be an ARP value associated with HPA calls, the S-NSSAI may be an S-NSSAI associated with HPA calls, and/or the assigned ISPL value may be an ISPL value associated with HPA calls.

As shown in FIG. 1A, for example, the assigned ARP value may be 6 ($ARP_{HPA}=6$) and the assigned ISPL value may be 8 ($ISPL_{(HPA)}=8$). The assigned ARP value and the assigned ISPL value are merely provided as examples. In practice, a different ARP value and/or a different ISPL value may be used in different situations. Generally, an ARP value that is lowest among multiple ARP values is indicative of a highest priority out of the multiple ARP values. Similarly, an ISPL value that is lowest among multiple ISPL values is indicative of a highest priority out of the multiple ISPL values.

In some implementations, the context information may further include preemption capability information (PCI). The PCI may indicate that the incoming HPA call bearer is entitled to preempt one or more bearers, associated with existing communication sessions. In other words, the one or more bearers may be preempted in order to establish the communication session. As an example, as shown in FIG. 1A, the context information may include $PCI_{HPA}=Y$. Base station 110 may determine that the context information includes the PCI and determine that the PCI indicates that one or more bearers may be preempted in order to establish the communication session. Accordingly, base station 110 may determine that one or more bearers are to be preempted in order to establish the communication session.

As shown in FIG. 1A, and by reference number 135, base station 110 may generate a first priority value indicating a priority associated with the request. The priority associated with the request may correspond to a priority associated with the communication session requested by UE 105. In some implementations, base station 110 may determine the first priority value based on determining that the PCI indicates that one or more bearers may be preempted in order to establish the communication session. Additionally, or alternatively, base station 110 may determine the first priority value based on determining that the request is associated with the HPA incoming call. As explained above, base station 110 may determine that the request is associated with the HPA incoming call based on the HPA information included in the request.

Base station 110 may determine the first priority value based on the first bearer information and the first network slice information. In some implementations, base station 110 may combine the first bearer information and the first network slice information using a mathematical operation. For example, base station 110 may combine the assigned ARP value and the assigned ISPL value using the mathematical operation. For instance, when combining the assigned ARP value and the assigned ISPL value, base station 110 may multiply the assigned ARP value and the assigned ISPL value to generate the first priority value. As shown in FIG. 1A, base station 110 may multiply $ARP_{HPA}$ (6) and $ISPL_{(HPA)}$ (8) to generate a priority value of 48.

Combining the assigned ARP value and the assigned ISPL value using multiplication is merely provided as an example. In practice, the assigned ARP value and the assigned ISPL value may be combined using one or more other mathematical operations or functions (e.g., addition, division, and/or subtraction), or combined using a combination of mathematical operations (e.g., a combination of subtraction, multiplication, division, and/or addition), among other examples. It is to be understood that such a calculation may also consider additional factors in determining the priority values such as PCI, preemption vulnerability information (PVI), among other examples.

Figure 1B:
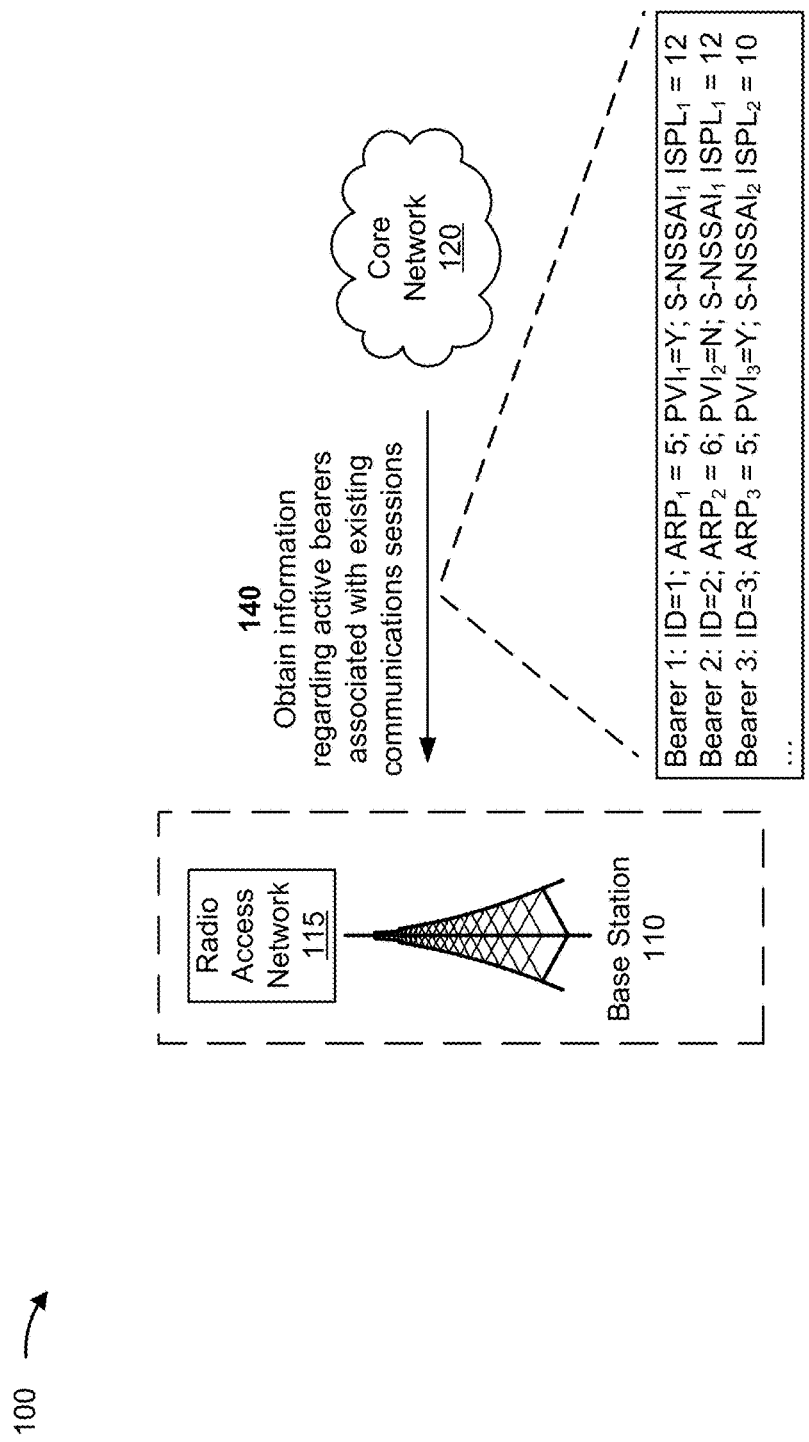

As shown in FIG. 1B, and by reference number 140, base station 110 may obtain information regarding active bearers associated with existing communications sessions. The term "active bearer" may be used to refer to a bearer that is associated with an existing communication session. In some examples, based on determining that the request includes the HPA information and/or based on determining that the request includes the PCI, base station 110 may provide an active bearer request to core network 120 and may receive the information from core network 120 based on the active bearer request. Base station 110 may provide the active bearer request to obtain the information regarding the active bearers and analyze the information regarding the active bearers to identify one or more active bearers that may be preempted in order to establish the communication session (requested by UE 105). Alternatively, base station 110 may receive the information from core network 120 prior to receiving the request to establish the communication session. For example, core network 120 may provide the information when the active bearers are established. Base station 110 may store the information.

The information regarding the active bearers may include second bearer information and second network slice information. The second bearer information may include information identifying the active bearers, ARP values associated with the active bearers, and/or PVI associated with the active bearers. The PVI may indicate whether the active bearers may be preempted (in order to establish the communication session). For example, if the PVI (associated with an active bearer) is set to the value "Y" (PVI=Y), the PVI would indicate that the active bearer may be preempted. Alternatively, if the PVI (associated with the active bearer) is set to the value "N" (PVI=N), the PVI would indicate that the active bearer may not be preempted.

As shown in FIG. 1B, for example, for a first active bearer (e.g., Bearer 1), the second bearer information may include information identifying the first active bearer (e.g., ID=1), an ARP value associated with the first active bearer (e.g., $ARP_1=5$), and the PVI associated with the first active bearer ($PVI_1=Y$). The PVI associated with the first active bearer indicates that the first active bearer may be preempted in order to establish the communication session. In this regard, an active bearer, associated with such PVI, may be referred to as a "vulnerable bearer."

As further shown in FIG. 1B, for example, for a second active bearer (e.g., Bearer 2), the second bearer information may include information identifying the second active bearer (e.g., ID=2), an ARP value associated with the second active bearer (e.g., $ARP_2=6$), and the PVI associated with the second active bearer ($PVI_2=N$). In this instance, the PVI associated with the second active bearer indicates that the second active bearer may not be preempted in order to establish the communication session.

The second network slice information may include information regarding one or more network slices (e.g., of core network 120) associated with the active bearers. In some implementations, the second network slice information may include one or more S-NSSAI that identify the one or more network slices.

As shown in FIG. 1B, for example, the first active bearer and the second active bearer may be associated with a first network slice identified by a first S-NSSAI (e.g., $S\text{-}NSSAI_1$). A third active bearer (e.g., Bearer 3) may be associated with a second network slice identified by a second S-NSSAI (e.g., $S\text{-}NSSAI_2$). In some implementations, base station 110 may analyze the S-NSSAI to determine ISPL values associated with the one or more network slices. For example, base station 110 may analyze an S-NSSAI to identify bits, of the S-NSSAI, that form an ISPL value.

As shown in FIG. 1B, for example, base station 110 may determine, based on analyzing $S\text{-}NSSAI_1$, that an ISPL value of the first network slice is 12 (e.g., $ISPL_1=12$). Similarly, base station 110 may determine, based on analyzing $S\text{-}NSSAI_2$, that an ISPL value of the second network slice is 10 (e.g., $ISPL_2=10$). In some instances, the second network slice information may include the ISPL values for the one or more networks slices. In such instances, base station 110 may not analyze the S-NSSAI to determine the ISPL values.

In some implementations, base station 110 may filter the information regarding the active bearers to identify one or more active bearers that may be preempted in order to establish the communication session requested by UE. For example, base station 110 may filter the information regarding the active bearers based on the PVI associated with the active bearers. For example, base station 110 may search the information regarding the active bearers to identify one or more active bearers associated with the PVI indicating that the one or more active bearers may be preempted.

If base station 110 is unable to identify any vulnerable bearer, base station 110 may reject the request. In other words, the base station 110 may prevent the communication session (requested by UE 105) from being established if base station 110 is unable to identify any vulnerable bearer.

Figure 1C:
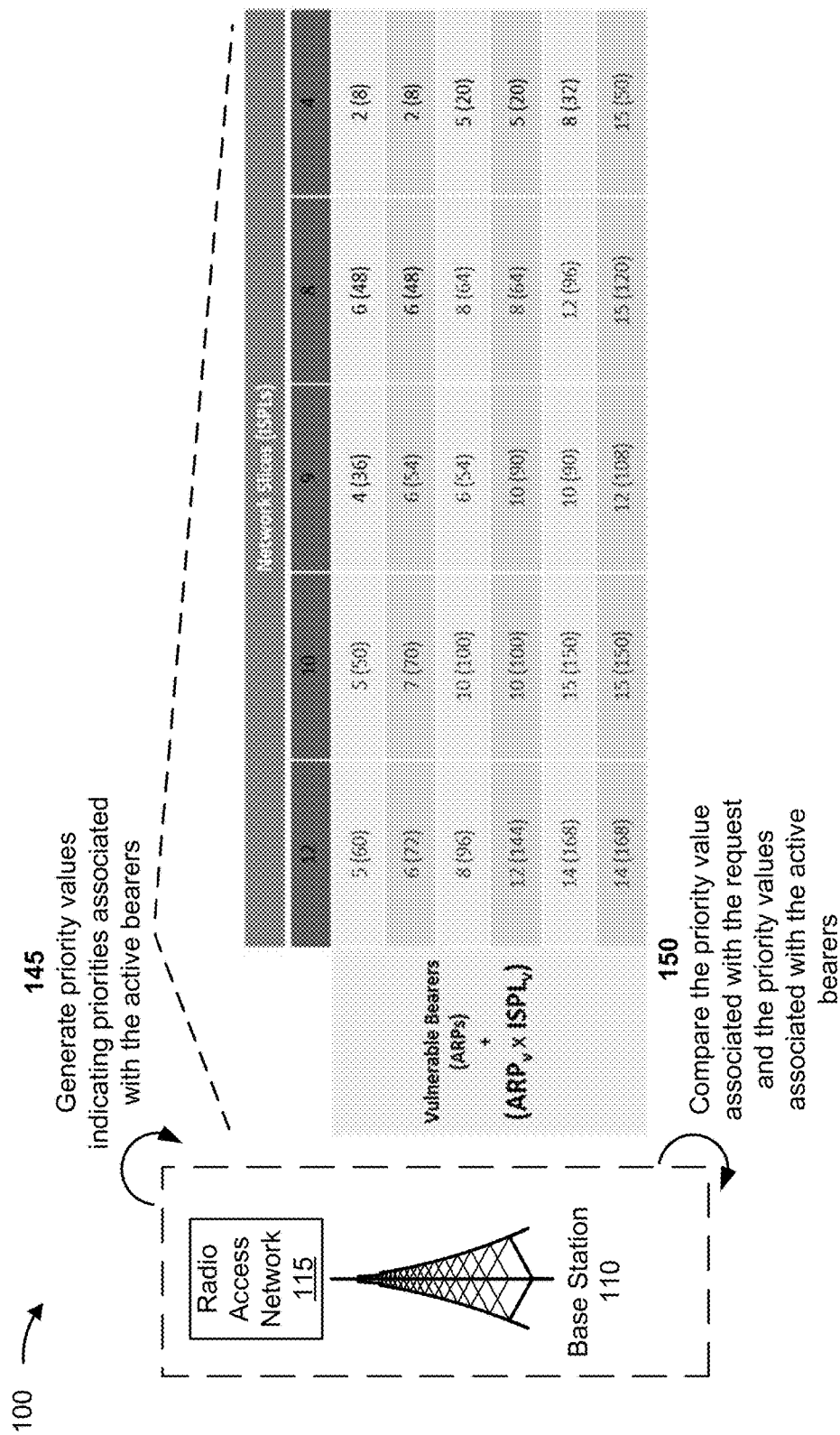

As shown in FIG. 1C, and by reference number 145, base station 110 may generate second priority values indicating priorities associated with the active bearers. For example, assume that base station 110 identifies vulnerable bearers. In this regard, base station 110 may generate priority values indicating the priorities associated with the vulnerable bearers. In some implementations, base station 110 may determine the second priority values based on determining that the PCI included is the request, as explained above. Additionally, or alternatively, base station 110 may determine the second priority values based on determining that the request is associated with the HPA incoming call, as explained above. Base station 110 may generate the second priority values in a manner similar to the manner described above in connection with the first priority value associated with the request.

For example, base station 110 may combine the second bearer information and the second network slice information using a mathematical operation. For example, base station 110 may combine the ARP values and the ISPL values using a mathematical operation. For instance, base station 110 may determine a priority value associated with a first vulnerable bearer (e.g., Bearer 1) by multiplying the ARP value associated with the first vulnerable bearer (e.g., $ARP_1=5$) and the ISPL value of the first network slice (e.g., $ISPL_1=12$) associated with the first vulnerable bearer. Accordingly, the priority value associated with the first vulnerable bearer will be 60. Base station 110 may determine a priority value associated with a second vulnerable bearer (e.g., Bearer 3) in a similar manner. Accordingly, the priority value associated with the second vulnerable bearer will be 50 (e.g., based on multiplying $ARP_3=5$ and $ISPL_2=10$). As shown in FIG. 1C, base station 110 may generate the second priority values of a plurality of vulnerable bearers associated with a plurality of network slices.

The first bearer information, the first network slice information, the second bearer information, and the second network slice information may be part of preemption parameters that are used by base station 110 to determine a manner in which one or active more bearers are to be preempted, as described herein.

As shown in FIG. 1C, and by reference number 150, base station 110 may compare the first priority value associated with the request and the second priority values associated with the active bearers (that are vulnerable bearers). For example, base station 110 may compare the first priority value (associated with the request) and the second priority values (associated with the vulnerable bearers) to identify one or more vulnerable bearers that may be preempted in order to establish the communication session.

In some implementations, base station 110 may rank the second priority values associated with the vulnerable bearers. For example, base station 110 may rank the second priority values (associated with the vulnerable bearers) in a descending order to obtain ranked second priority values. In this regard, the priority value (e.g., 60) associated with the first vulnerable bearer may be ranked higher than the priority value (e.g., 50) associated with the second vulnerable bearer.

A highest ranked priority value, out of the ranked second priority values, of a vulnerable bearer, may be associated with a lowest priority out of the priorities associated with the vulnerable bearers. Accordingly, base station 110 may rank the second priority values in the descending order to rank the vulnerable bearers in an order of increasing priority. In this regard, the priority value (e.g., 60) associated with the first vulnerable bearer may ranked higher than the priority value (e.g., 50) associated with the second vulnerable bearer. Accordingly, base station 110 may determine that the priority associated with the second vulnerable bearer exceeds the priority associated with the first vulnerable bearer. Base station 110 may rank the second priority values (associated with the vulnerable bearers) in the descending order to enable base station 110 to first identity vulnerable bearers associated with lowest priorities as vulnerable bearers to be preempted.

Base station 110 may compare the first priority value (associated with the request) and the ranked second priority values to identify one or more of the ranked second priority values that exceed the first priority value associated with the request. In other words, base station 110 may compare the first priority value and the ranked second priority values to identify one or more vulnerable bearers associated with priorities that are lower than the priority associated with the request. Therefore, base station 110 may compare the first priority value and the ranked second priority values to identify one or more vulnerable bearers that may be preempted.

If base station 110 is unable to identify any vulnerable bearer associated with a priority that is lower than the priority associated with the request, base station 110 may reject the request. In other words, base station 110 may prevent the communication session (requested by UE) from being established if base station 110 is unable to identify any vulnerable bearer associated with a priority value that is lower than the priority value associated with the request.

Figure 1D:
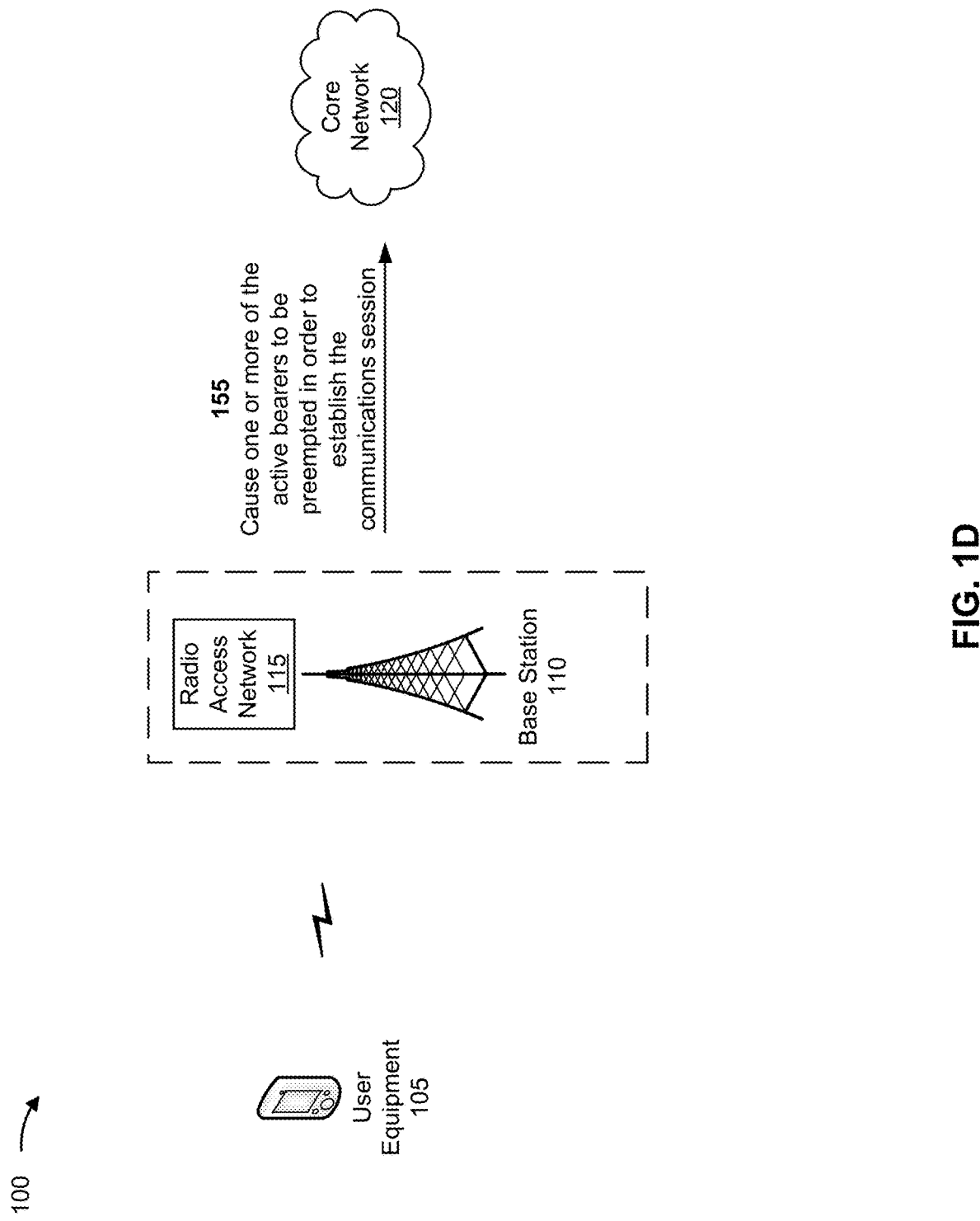

As shown in FIG. 1D, and by reference number 155, base station 110 may cause one or more of the active bearers (e.g., that are vulnerable bearers) to be preempted in order to establish the communications session. For example, assume that, based on the comparison, base station 110 identifies one or more vulnerable bearers associated with priority values that are lower than the first priority value associated with the request. Base station 110 may identify the one or more vulnerable bearers as candidate vulnerable bearers to be preempted. For example, base station 110 may identify the first vulnerable bearer (e.g., associated with a priority value of 60) and the second vulnerable bearer (e.g., associated with a priority value of 50) as vulnerable bearers to be preempted because the priority values (of the first vulnerable bearer and the second vulnerable bearer) are lower than the first priority value (e.g., 48) associated with the request.

In some implementations, if base station 110 identifies multiple vulnerable bearers that are vulnerable bearers to be preempted, base station 110 may select, for preemption, one or more vulnerable bearers associated with highest priority values out of the second priority values associated with the multiple vulnerable values. The one or more vulnerable bearers (associated with highest priority values) may correspond to one or more vulnerable bearers associated with lowest priorities out of the priorities associated with the multiple vulnerable bearers. In this regard, base station 110 may cause the selected one or more vulnerable bearers to be preempted, thereby causing one or more existing communication sessions, associated with the selected one or more vulnerable bearers, to be terminated in order to establish the communication session associated with the request.

Consider the first vulnerable bearer (e.g., associated with a priority value of 60) and the second vulnerable bearer (e.g., associated with a priority value of 50), for example. Base station 110 may select the first vulnerable bearer prior to selecting the second vulnerable bearer because the priority value of 60 exceeds the priority value of 50. Base station 110 may cause an existing communication session, associated with the first vulnerable bearer, to be terminated in order to establish the communication session associated with the request. In some implementations, base station 110 may preempt one or more additional vulnerable bearers based on the quality of service identified by the request. For example, base station 110 may preempt two or more vulnerable bearers in order to satisfy the quality of service.

In some situations, a vulnerable bearer associated with a lowest priority may not be suitable for preemption because the vulnerable bearer may not provide sufficient resources for the communication session. For example, assume that the bearer is a Guaranteed Bit Rate (GBR) bearer and that base station 110 determines that a vulnerable bearer, associated with a lowest priority, is not a GBR bearer. Base station 110 may determine that preempting the vulnerable bearer will not allocate sufficient resources to establish the communication session. Accordingly, base station 110 may determine whether a next vulnerable bearer, associated with a next lowest priority, is GBR bearer. Base station 110 may iterate the foregoing actions until base station 110 identifies a vulnerable bearer that is a GBR bearer with sufficient resources.

By determining a priority of a bearer based on the bearer information and the network slice information as described herein, base station 110 may remove the ambiguities described above with respect to determining priorities associated with bearers that are associated with one or more network slices. Accordingly, base station 110 may ensure that an appropriate bearer is preempted, thereby causing an existing communication session (associated with the bearer) to be preempted in order to enable a new communication session to be established. By ensuring that the appropriate bearer and the existing communication session are preempted, base station 110 may preserve computing resources, network resources, and other resources that would have been consumed by determining a cause of unintentionally preempting the existing communication session, re-determining a priority associated with the bearer, and/or re-establishing the existing communication session, among other examples. In this regard, base station 110 may execute priority preemption, associated with bearers, in a complex network slicing and traffic mix environment.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
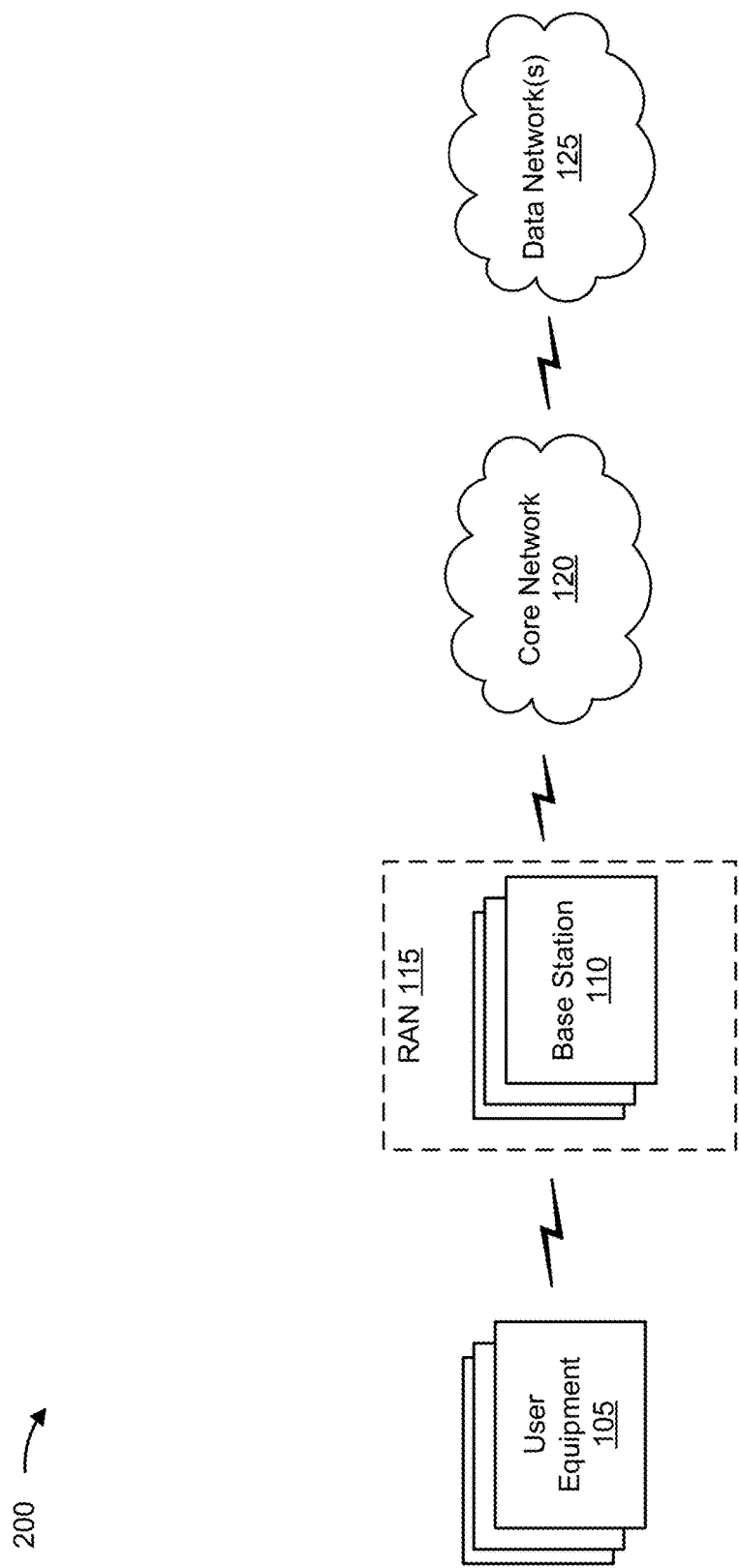
FIG. 2 is a diagram of an example environment in which systems and/or methods described herein may be implemented.
Figure 3:
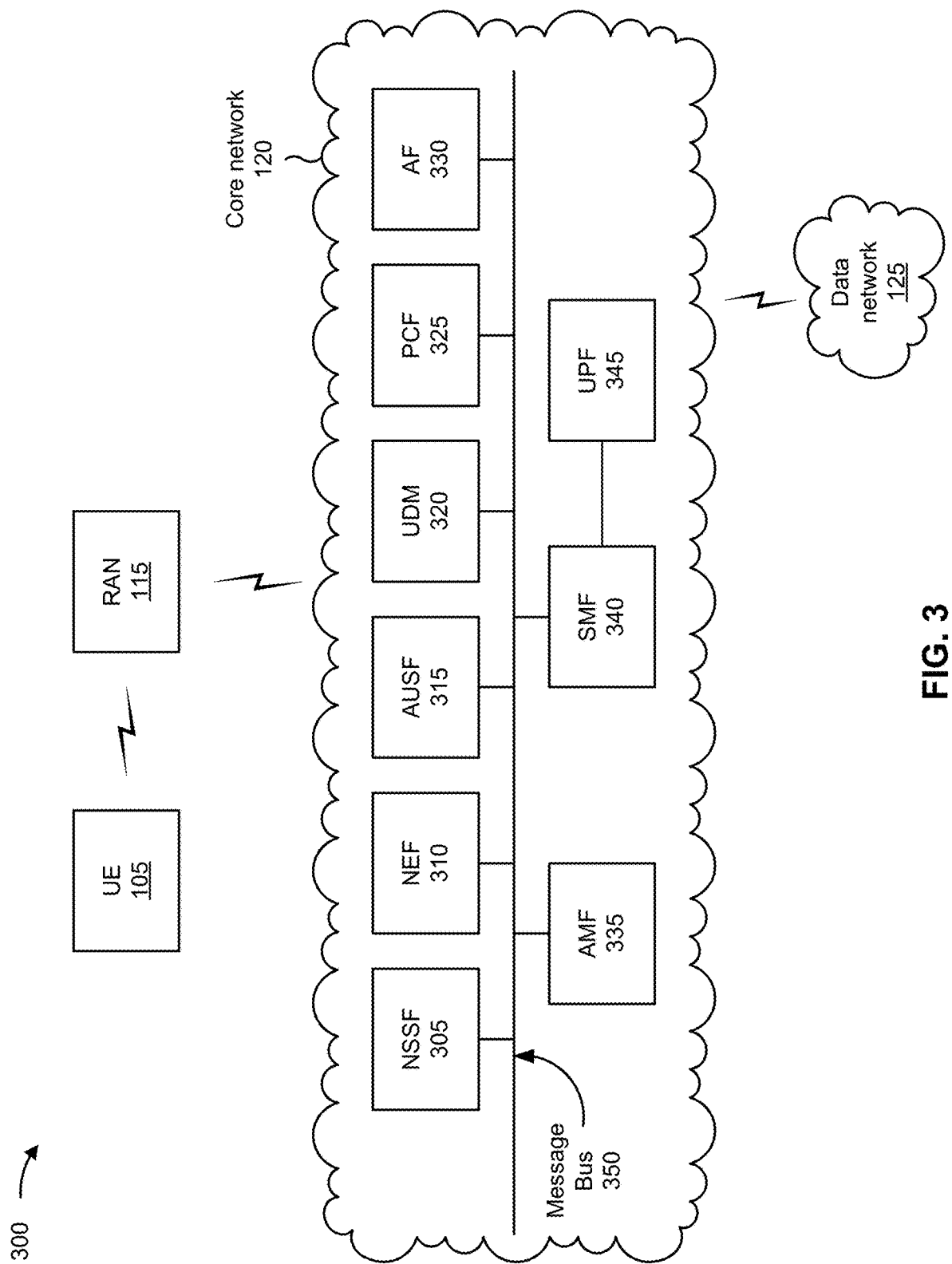
FIG. 3 is a diagram of an example environment in which systems and/or methods described herein may be implemented.

FIG. 2 is a diagram of an example environment 200 in which systems and/or methods, described herein, can be implemented. As shown in FIG. 3, environment 200 can include UE 105, base station 110, RAN 115, core network 120, and data network 125. Devices of environment 200 can interconnect via wired connections, wireless connections, or a combination of wired and wireless connections.

UE 105 includes one or more devices capable of communicating with RAN 115 and/or a data network 125 (e.g., via core network 120). For example, UE 105 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 105 can be capable of communicating using uplink (e.g., UE to RAN) communications, downlink (e.g., RAN to UE) communications, and/or sidelink (e.g., UE-to-UE) communications. In some implementations, UE 105 can include a machine-type communication (MTC) UE, such as an evolved or enhanced MTC (eMTC) UE. In some implementations, UE 105 can include an Internet of things (IoT) UE, such as a narrowband IoT (NB-IoT) UE, among other examples.

RAN 115 includes one or more devices capable of communicating with UE 105 using a cellular radio access technology (RAT). For example, RAN 115 can include a base station 110, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 110 has the same characteristics and functionality of RAN 115, and vice versa. RAN 115 can transfer traffic between UE 105 (e.g., using a cellular RAT), one or more other RANs 115 (e.g., using a wireless interface or a backhaul interface, such as a wired backhaul interface), and/or core network 120. RAN 115 can provide one or more cells that cover geographic areas. Some RANs 115 can be mobile base stations. Some RANs 115 can be capable of communicating using multiple RATs.

In some implementations, RAN 115 can perform scheduling and/or resource management for UEs 105 covered by RAN 115 (e.g., UEs 105 covered by a cell provided by RAN 115). In some implementations, RAN 115 can be controlled or coordinated by a network controller, which can perform load balancing, network-level configuration, and/or the like. The network controller can communicate with RAN 115 via a wireless or wireline backhaul. In some implementations, RAN 115 can include a network controller, a self-organizing network (SON) module or component, or a similar module or component. In other words, RAN 115 can perform network control, scheduling, and/or network management functions (e.g., for other RAN 115 and/or for uplink, downlink, and/or sidelink communications of UEs 105 covered by RAN 115). In some implementations, RAN 115 can apply network slice policies to perform the network control, scheduling, and/or network management functions. In some implementations, RAN 115 can include a central unit and multiple distributed units. The central unit can coordinate access control and communication with regard to the multiple distributed units. The multiple distributed units can provide UEs 105 and/or other RANs 115 with access to data network 125 via core network 120.

Core network 120 includes various types of core network architectures, such as a 5G Next Generation (NG) Core (e.g., core network 120 of FIG. 3), an LTE Evolved Packet Core (EPC), among other examples. In some implementations, core network 120 can be implemented on physical devices, such as a gateway, a mobility management entity, among other examples. In some implementations, the hardware and/or software implementing core network 120 can be virtualized (e.g., through the use of network function virtualization and/or software-defined networking), thereby allowing for the use of composable infrastructure when implementing core network 120. In this way, networking, storage, and compute resources can be allocated to implement the functions of core network 120 (described with regard to FIG. 4) in a flexible manner as opposed to relying on dedicated hardware and software to implement these functions.

Data network 125 includes one or more wired and/or wireless data networks. For example, data network 125 can include an Internet Protocol (IP) Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, or an operator services network, among other examples, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 3 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

FIG. 3 is a diagram of an example environment 300 in which systems and/or methods described herein may be implemented. As shown in FIG. 3, example environment 300 may include UE 105, RAN 115, core network 120, and data network 125. Devices and/or networks of example environment 300 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 115 may support, for example, a cellular RAT. RAN 115 may include one or more base stations (e.g., base transceiver stations, radio base stations, node Bs, eNodeBs (eNBs), gNodeBs (gNBs), base station subsystems, cellular sites, cellular towers, access points, TRPs, radio access nodes, macrocell base stations, microcell base stations, picocell base stations, femtocell base stations, or similar types of devices) and other network entities that can support wireless communication for UE 105. RAN 115 may transfer traffic between UE 105 (e.g., using a cellular RAT), one or more base stations (e.g., using a wireless interface or a backhaul interface, such as a wired backhaul interface), and/or core network 120. RAN 115 may provide one or more cells that cover geographic areas.

In some implementations, RAN 115 may perform scheduling and/or resource management for UE 105 covered by RAN 115 (e.g., UE 105 covered by a cell provided by RAN 115). In some implementations, RAN 115 may be controlled or coordinated by a network controller, which may perform load balancing, network-level configuration, and/or other operations. The network controller may communicate with RAN 115 via a wireless or wireline backhaul. In some implementations, RAN 115 may include a network controller, a SON module or component, or a similar module or component. In other words, RAN 115 may perform network control, scheduling, and/or network management functions (e.g., for uplink, downlink, and/or sidelink communications of UE 105 covered by RAN 115).

In some implementations, core network 120 may include an example functional architecture in which systems and/or methods described herein may be implemented. For example, core network 120 may include an example architecture of a 5G NG core network included in a 5G wireless telecommunications system. While the example architecture of core network 120 shown in FIG. 2 may be an example of a service-based architecture, in some implementations, core network 120 may be implemented as a reference-point architecture and/or a 4G core network, among other examples.

As shown in FIG. 3, core network 120 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345 These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 305 includes one or more devices that select network slice instances for UE 105. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating UE 105 in the wireless telecommunications system.

UDM 320 includes one or more devices that store user data and profiles in the wireless telecommunications system. UDM 320 may be used for fixed access and/or mobile access in core network 120.

PCF 325 includes one or more devices that provide a policy framework that incorporates network slicing, roaming, packet processing, and/or mobility management, among other examples.

AF 330 includes one or more devices that support application influence on traffic routing, access to NEF 310, and/or policy control, among other examples.

AMF 335 includes one or more devices that act as a termination point for non-access stratum (NAS) signaling and/or mobility management, among other examples.

SMF 340 includes one or more devices that support the establishment, modification, and release of communication sessions in the wireless telecommunications system. For example, SMF 340 may configure traffic steering policies at UPF 345 and/or may enforce user equipment IP address allocation and policies, among other examples.

UPF 345 includes one or more devices that serve as an anchor point for intraRAT and/or interRAT mobility. UPF 345 may apply rules to packets, such as rules pertaining to packet routing, traffic reporting, and/or handling user plane QoS, among other examples.

Message bus 350 represents a communication structure for communication among the functional elements. In other words, message bus 350 may permit communication between two or more functional elements.

Data network 125 includes one or more wired and/or wireless data networks. For example, data network 125 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
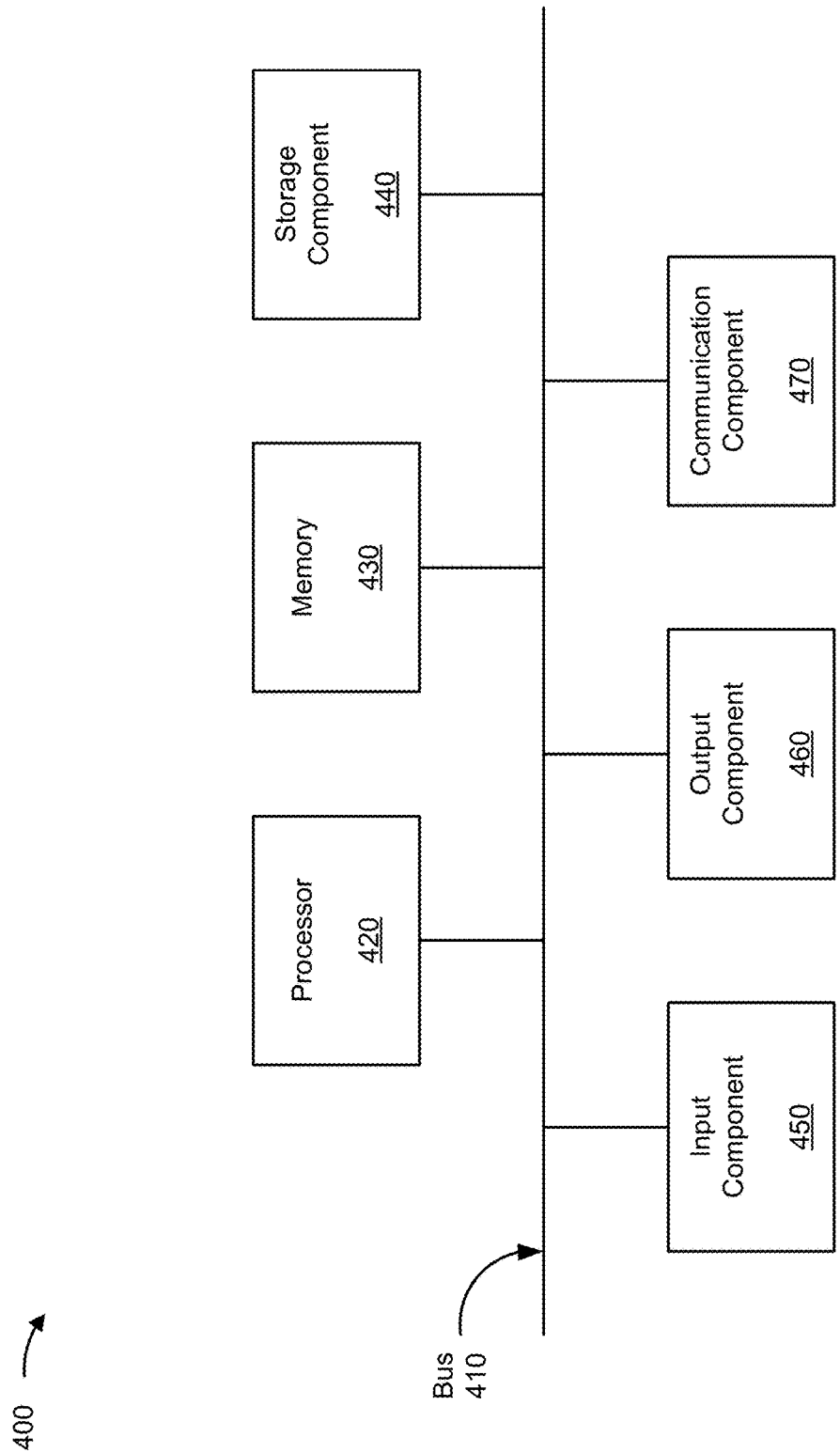
FIG. 4 is a diagram of example components of one or more devices of FIGS. 2 and 3.

FIG. 4 is a diagram of example components of a device 400, which may correspond to UE 105 and/or base station 110. In some implementations, UE 105 and/or base station 110 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
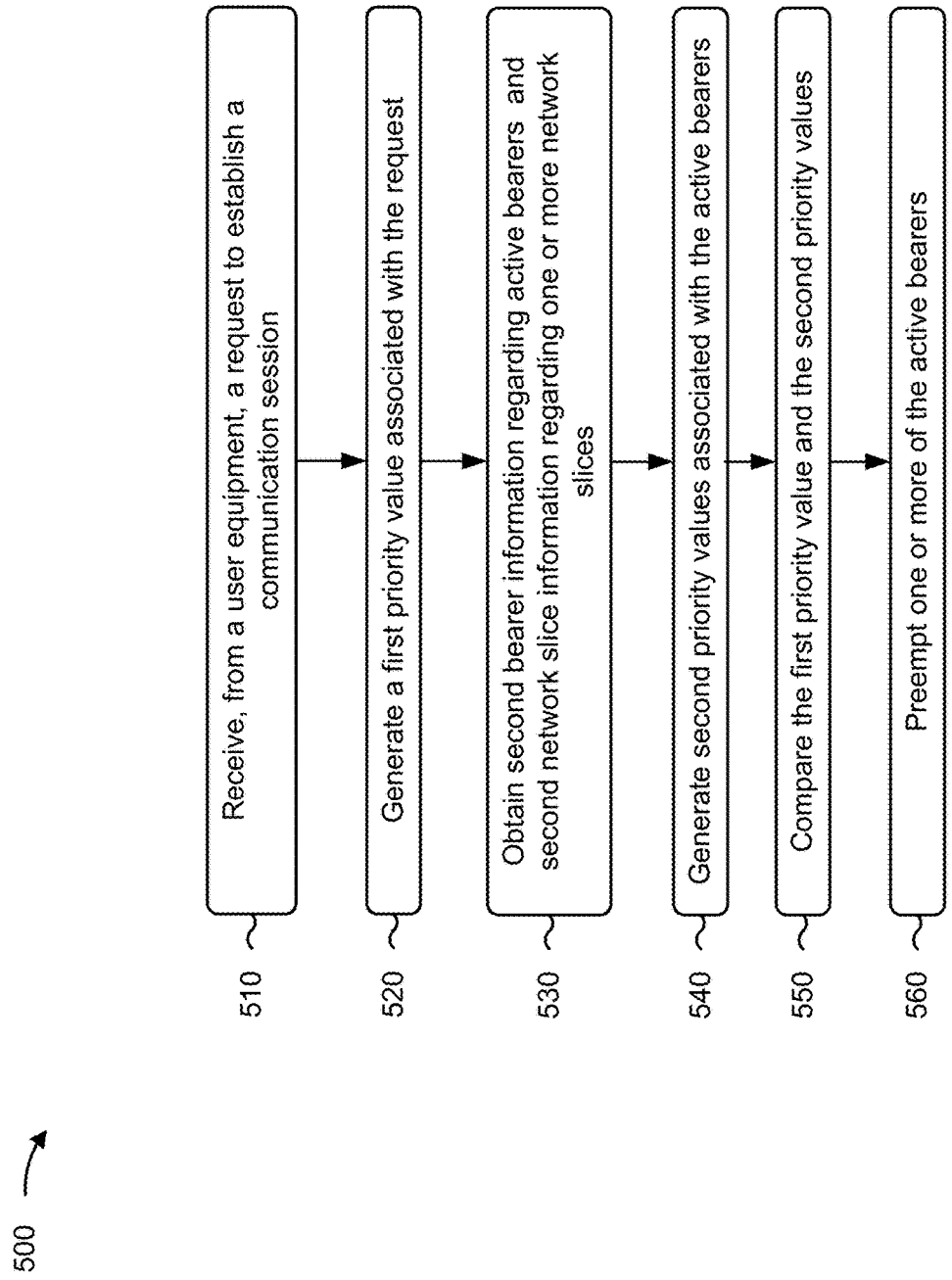
FIG. 5 is a flowchart of an example process relating to preempting a bearer associated with a communication session in accordance with an embodiment described herein.

FIG. 5 is a flowchart of an example process 500 relating to preempting a bearer associated with a communication session. In some implementations, one or more process blocks of FIG. 5 may be performed by a device (e.g., base station 110). In some implementations, one or more process blocks of FIG. 5 may be performed by another device or a group of devices separate from or including the device, such as a UE (e.g., UE 105). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from a user equipment, a request to establish a communication session with a network (block 510). For example, the device may receive, from a user equipment, a request to establish a communication session with a network, wherein the request includes first bearer information regarding a bearer and first network slice information regarding a network slice of the network, as described above. In some implementations, the request includes first bearer information regarding a bearer and first network slice information regarding a network slice of the network.

In some implementations, the first bearer information includes bearer type information identifying a type of bearer that is used to identify an allocation and retention priority (ARP) value associated with establishing the communication session, and wherein the first network slice information includes an ISPL value associated with establishing the communication session.

As further shown in FIG. 5, process 500 may include generating a first priority value, associated with the request, based on the first bearer information and the first network slice information (block 520). For example, the device may generate a first priority value, associated with the request, based on the first bearer information and the first network slice information, as described above.

In some implementations, generating the first priority value comprises combining the first bearer information and the first network slice information, using a mathematical operation, to determine the first priority value, and wherein generating the second priority values associated with the active bearers comprises combining the second bearer information and the second network slice information, using the mathematical operation, to determine the second priority values.

In some implementations, determining the first priority value comprises determining that the request includes PCI indicating that at least one bearer, of the active bearers, is available to be preempted to establish the communication session, and determining the first priority value based on determining that the request includes the PCI.

As further shown in FIG. 5, process 500 may include obtaining second bearer information regarding active bearers associated with existing communication sessions in the network and second network slice information regarding one or more network slices, of the network, associated with the active bearers (block 530). For example, the device may obtain second bearer information regarding active bearers associated with existing communication sessions in the network and second network slice information regarding one or more network slices, of the network, associated with the active bearers, as described above.

As further shown in FIG. 5, process 500 may include generating second priority values associated with the active bearers based on the second bearer information and the second network slice information (block 540). For example, the device may generate second priority values associated with the active bearers based on the second bearer information and the second network slice information, as described above.

As further shown in FIG. 5, process 500 may include comparing the first priority value and the second priority values (block 550). For example, the device may compare the first priority value and the second priority values, as described above.

In some implementations, comparing the first priority value and the second priority values comprises ranking the second priority values to obtain ranked second priority values, and comparing the first priority value and the ranked second priority values in an order of the ranked second priority values.

As further shown in FIG. 5, process 500 may include preempting one or more of the active bearers (block 560). For example, the device may preempt one or more of the active bearers, based on comparing the priority value and the second priority values, to establish the communication session, as described above.

In some implementations, preempting the one or more of the active bearers to comprises determining that the second priority values of the one or more of the active bearers exceed the first priority value associated with the request, and preempting the one or more of the active bearers based on determining that the second priority values of the one or more of the active bearers exceed the first priority value associated with the request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a request to establish a communication session with a network,
      wherein the request includes first bearer information regarding a bearer and first network slice information regarding a network slice of the network;
   generating, by the device, a first priority value, associated with the request, based on the first bearer information and the first network slice information;
   obtaining, by the device, second bearer information regarding active bearers associated with existing communication sessions in the network and second network slice information regarding one or more network slices, of the network, associated with the active bearers;
   generating, by the device, second priority values associated with the active bearers based on the second bearer information and the second network slice information;
   comparing, by the device, the first priority value and the second priority values; and
   preempting, by the device, one or more of the active bearers, based on the comparing.

2. The method of claim 1, further comprising:
   determining that the request is associated with a high priority access (HPA) incoming call;
   wherein generating the first priority value associated with the request comprises:
      determining the first priority value based on determining that the request is associated with the HPA incoming call; and
   wherein generating the second priority values associated with the active bearers comprises:
      determining the second priority values based on determining that the request is associated with an HPA incoming call.

3. The method of claim 1, wherein the first bearer information includes bearer type information identifying a type of bearer that is used to identify an allocation and retention priority (ARP) value associated with establishing the communication session; and
    wherein the first network slice information includes an inter-slice priority level (ISPL) value associated with establishing the communication session.

4. The method of claim 1, wherein generating the first priority value comprises:
    determining the first priority value based on the first bearer information and the first network slice information; and
wherein generating the second priority values associated with the active bearers comprises:
    determining the second priority values based on the second bearer information and the second network slice information.

5. The method of claim 1, wherein comparing the first priority value and the second priority values comprises:
    ranking the second priority values to obtain ranked second priority values; and
    comparing the first priority value and the ranked second priority values in an order of the ranked second priority values.

6. The method of claim 1, wherein preempting the one or more of the active bearers comprises:
    determining that the second priority values of the one or more of the active bearers are different than the first priority value associated with the request; and
    preempting the one or more of the active bearers based on determining that the second priority values of the one or more of the active bearers are different than the first priority value associated with the request.

7. The method of claim 1, wherein generating the first priority value comprises:
    determining that the request includes preemption capability information (PCI) indicating that at least one bearer, of the active bearers, is available to be preempted to establish the communication session; and
    determining the first priority value based on determining that the request includes the PCI.

8. A device, comprising:
    one or more processors configured to:
        receive, from a user equipment, a request to establish a communication session with a network,
            wherein the request includes first bearer information regarding a bearer associated with establishing the communication session and first network slice information regarding a network slice, of the network, associated with establishing the communication session;
        combine the first bearer information and the first network slice information to generate a first priority value associated with establishing the communication session;
        obtain second bearer information regarding active bearers associated with existing communication sessions in the network and second network slice information regarding one or more network slices, of the network, associated with the active bearers;
        combine the second bearer information and the second network slice information to generate second priority values associated with the active bearers;
        compare the first priority value and the second priority values;
        cause one or more of the existing communication sessions to be terminated based on comparing the first priority value and the second priority values; and
        cause the communication session to be established after causing the one or more of the existing communication sessions to be terminated.

9. The device of claim 8, wherein the one or more processors are further configured to:
    rank the second priority values in a descending order to obtain ranked second priority values; and
    compare the first priority value and the ranked second priority values to identify one or more of the ranked second priority values that exceed the first priority value,
        wherein the one or more of the existing communication sessions are associated with the one or more of the ranked second priority values.

10. The device of claim 8, wherein the one or more processors are further configured to:
    determine that the second priority values associated with one or more of the active bearers exceed the first priority value associated with the request,
        wherein the one or more of the active bearers are associated with the one or more of the existing communication sessions; and
    cause the one or more of the existing communication sessions to be terminated based on determining that the second priority values associated with the one or more of the active bearers exceed the first priority value associated with the request.

11. The device of claim 8, wherein the one or more processors are further configured to:
    determine that the second bearer information includes preemption vulnerability information (PVI) indicating that the active bearers can be preempted; and
    determine the second priority values based on determining that the second bearer information includes the PVI indicating that the active bearers can be preempted.

12. The device of claim 8, wherein the one or more processors are further configured to:
    determine that the request includes preemption capability information (PCI) indicating that at least one bearer, of the active bearers, can be preempted to establish the communication session; and
    determine the first priority value based on determining that the request includes the PCI.

13. The device of claim 8, wherein the first bearer information includes bearer type information identifying a type of bearer that is used to identify an allocation and retention priority (ARP) value associated with establishing the communication session; and
    wherein the first network slice information includes an inter-slice priority level (ISPL) value associated with establishing the communication session.

14. The device of claim 8, wherein the one or more processors are further configured to:
    determine that the request is associated with a high priority access (HPA) call; and
    wherein the one or more processors, to cause the one or more of the existing communication sessions to be terminated, are configured to:
        cause the one or more of the existing communication sessions to be terminated based on determining that the request is associated with the HPA call.

15. A non-transitory computer-readable medium storing a set of instructions, the set of instructions comprising:

one or more instructions that, when executed by one or more processors of a device, cause the device to:
  receive, from a user equipment, first bearer information regarding a bearer associated with establishing a communication session with a network and first network slice information regarding a network slice, of the network, associated with establishing the communication session;
  generate, based on the first bearer information and the first network slice information, a first priority value indicating a priority associated with establishing the communication session;
  obtain second bearer information regarding active bearers associated with existing communication sessions in the network and second network slice information regarding one or more network slices, of the network, associated with the active bearers;
  generate, based on the second bearer information and the second network slice information, second priority values associated with the active bearers;
  compare the first priority value and the second priority values; and
  cause one or more of the existing communication sessions to be terminated, based on comparing the first priority value and the second priority values, to enable the communication session to be established.

16. The non-transitory computer-readable medium of claim 15, wherein the first bearer information includes an allocation and retention priority (ARP) value associated with establishing the communication session; and
  wherein the first network slice information includes an inter-slice priority level (ISPL) value associated with establishing the communication session.

17. The non-transitory computer-readable medium of claim 15, wherein the one or more instructions, that cause the device to compare the first priority value and the second priority values, cause the device to:
  rank the second priority values in a descending order to obtain ranked second priority values,
    wherein a highest ranked priority value, out of the ranked second priority values, is associated with a lowest priority out of the active bearers; and
  compare the first priority value and the ranked second priority values to identify one or more of the ranked second priority values that exceed the first priority value,
    wherein the one or more of the existing communication sessions are associated with the one or more of the ranked second priority values.

18. The non-transitory computer-readable medium of claim 17, wherein the one or more instructions, that cause the device to generate the second priority values, cause the device to:
  generate a first priority value associated with a first active bearer of the active bearers;
  generate a second priority value associated with a second active bearer of the active bearers; and
  wherein the one or more instructions, that cause the device to rank the second priority values, cause the device to:
    rank the first priority value, associated with the first active bearer, and the second priority value, associated with the second active bearer, in the descending order to obtain the ranked second priority values.

19. The non-transitory computer-readable medium of claim 15, wherein the one or more instructions, that cause the device to generate the first priority value, cause the device to:
  combine the first bearer information and the first network slice information, using a mathematical operation, to generate the first priority value; and
  wherein the one or more instructions, that cause the device to generate the second priority values, cause the device to:
    combine the second bearer information and the second network slice information, using the mathematical operation, to generate the second priority values.

20. The non-transitory computer-readable medium of claim 15, wherein the one or more instructions, that cause the device to generate the first priority value, cause the device to:
  determine that the first bearer information includes pre-emption capability information (PCI) indicating that at least one bearer, of the active bearers, is available to be preempted in order to establish the communication session; and
  determine the first priority value based on determining that the first bearer information includes the PCI.

* * * * *